Patented Jan. 23, 1945

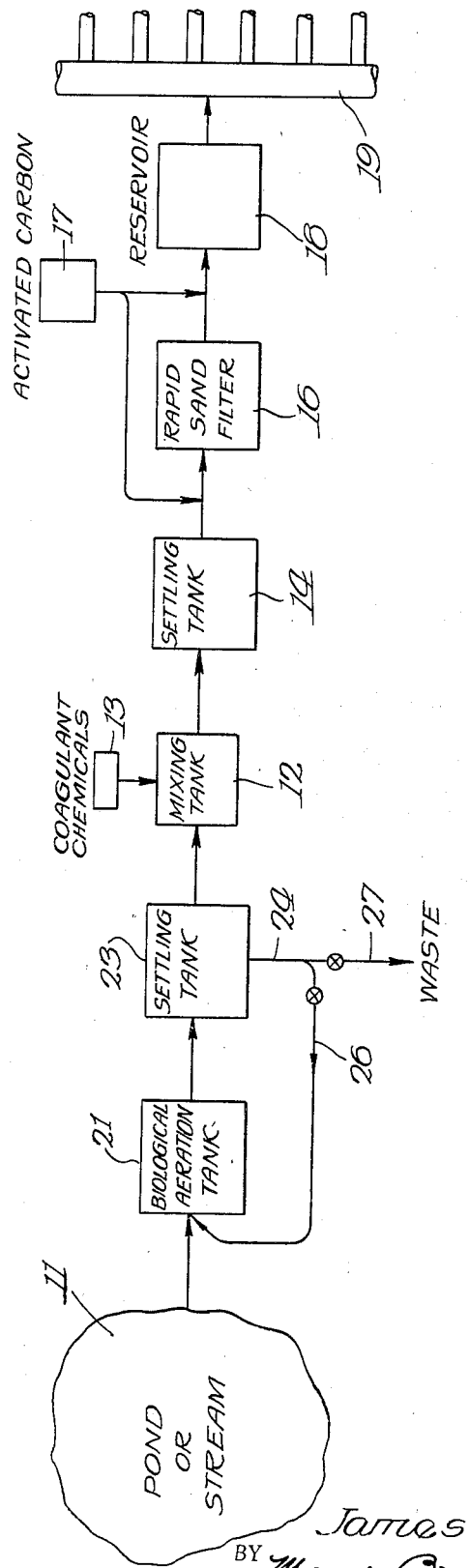

2,368,055

UNITED STATES PATENT OFFICE 2,368,055

WATER PURIFICATION SYSTEM

James D. Walker, Aurora, Ill., assignor to The American Well Works, Aurora, Ill., a corporation of Illinois Application March 27, 1940, Serial No. 326,239

2 Claims. (Cl. 210—16)

The purification of water supplies for drinking purposes is a highly specialized art, due in part to the fact that mere traces of foreign substances had to be dealt with. In a method which has become more or less standard, the water is first mixed with chemicals to cause coagulation and precipitation of foreign substances, then flowed through a settling tank and a sand filter to remove the precipitant and other solids, and then treated with such additional materials as may be necessary, including activated carbon, for removing traces of color, odor or taste.

In the case of some water supplies a relatively large amount of activated carbon has been necessary, and, since this material is relatively expensive, the cost of removing the color, taste and odor has sometimes been considered prohibitive. According to the present invention the water is given such treatment in addition to the conventional water treatments that the substances which have heretofore been considered difficult to remove are substantially removed prior to the treatment with activated carbon so that only a very small amount of the activated carbon need be used for complete removal of the taste, color and odor.

The new treatment which is used in accordance with this invention is a treatment with activated biological agents such as aerobic bacteria. This method of treatment is outwardly very similar to the activated sludge treatment used in sewage, although the results of its use in sewage treatment are so different from the results needed for water treatment as to discourage any thought of its adaptability. Although activated sludge treatment has been known to be very efficient for the relatively heavy loads of organic matter found in sewage, it has been observed that its apparent efficiency greatly decreased as the treatment progressed. The first half of the impurities might be treated in an hour or less, but the next 40% might take several hours. The curves representing the percentage of impurities treated as the activated sludge treatment progresses are of the type known as asymptotic, meaning that they approach the line representing complete treatment, and get closer and closer to tangency with it but never quite reach it. Activated sludge treatment of sewage has taken place on the steep portion of the curve, where the treatment seemed to be highly efficient. It has generally been considered impractical to carry the activated sludge treatment to the extent of removing the impurities so completely as to make it immediately fit for use in a drinking water supply. The effluents flowing from a sewage treatment plant, even when so completely clarified as to indicate exceptionally good sewage treatment, have nevertheless included a sufficient proportion of objectionable matter so that further clarification and purification by natural processes in the stream or other body of water was considered necessary before the use of such effluent for supplying water to city water works. In short, in spite of the highly satisfactory character of activated sludge treatment for sewage, it has been supposed that its practical use ended well above the degree of purity encountered in drinking water supplies. Indeed, sewage sludge in its normal form is probably incapable of satisfactorily treating water supplies.

Nevertheless, according to the present invention a similar process is used for treatment of water supplies, and this treatment is so efficient that for at least some types of water supplies it is much more economical than using the relatively large quantities of activated carbon required without this treatment. This is particularly true in the case of water supplies having taste, odor and color complexes therein which are difficult to remove and which are not effectively removed by methods of water treatment, other than by activated carbon, which have heretofore been conventional.

It is possible that one reason the method of treatment of this invention is more efficient than would have been supposed heretofore is that a slightly different strain of biological agents develop during this treatment, a strain which is more effective for the particular water supply being treated than would be the strains which have heretofore been developed in sewage treatment and which have not appeared to be efficient at the low values of impurities. Whether this theory is true or not, the fact remains that the treatment is highly efficient.

Additional objects and advantages of the invention will be apparent from the following description and from the drawing, in which:

The figure comprises a flow diagram for a water treatment system embodying the present invention.

A preferred form of the invention has been chosen for illustration and description, in compliance with section 4888 of the Revised Statutes, but persons skilled in the art will readily perceive other means for accomplishing the same results, and the claims are therefore to be construed as broadly as possible, consistent with the prior art.

Certain steps in the illustrated method of treatment are conventional and these will therefore be described first, even though in accordance with this invention they are preceded by other steps. In the conventional treatment of water to be used for drinking water or for miscellaneous city uses the water flows from a source of supply 11 to a coagulant mixing tank 12, where it is mixed with chemicals tending to coagulate the impurities in the water and possibly combine with some substances that are in solution so as to convert them into insoluble substances which will precipitate out. The chemicals may be supplied from any suitable source, indicated diagrammatically at 13.

From the mixing tank 12 the water flows to a settling tank 14 where it is maintained sufficiently quiescent for the solids, including the precipitant formed in tank 12, to settle out. The clear water will flow from the surface or near the surface through a sand filter 16 which tends to remove any particles that were too fine to settle in the settling tank 14 during the retention time allowed.

After this stage the solids are pretty thoroughly removed from the water but there may remain some impurities which impart to the water an undesirable color, taste or odor. These impurities may for convenience be called complexes. It is obvious that the complexes which remain are of a nature not removed by the chemical treatment or sand filter. It has been the practice in the past to remove them when necessary by adding to the water at one or more points small amounts of activated carbon from a suitable source of supply, indicated diagrammatically at 17. This activated carbon will not remove all tastes, odors and colors but, to the extent that it works, it in effect absorbs the complexes, either rendering them ineffective or possibly removing them by settling out in the reservoir 18. From the reservoir 18 the water will flow into the distribution system 19. Obviously the flow between any stages or into the distribution system may be accomplished by pumps when necessary.

With some sources of supply the foregoing treatment is adequate and satisfactory. From other sources of supply the taste, odor and color complexes which are difficult to remove are in sufficient proportion to require a substantial amount of activated carbon for their removal. Activated carbon is relatively expensive. It is therefore desirable to find some less expensive way of removing the complexes.

According to the present invention the water from the source of supply 11 flows into an aeration tank 21 instead of flowing directly to the mixing tank 12. The aeration tank 21 may be identical with any type of aeration tank heretofore used in treating sewage, for example. In some of these tanks the aeration and mixing is accomplished by the admission of small bubbles of compressed air at the bottom of the tank. In others an axial flow pump is employed in a tank for mixing the contents of the tank, and the inlet of the pump is connected with a device which causes the admixture of air to the liquid as the liquid is drawn into the pump. An aerating tank of this nature is disclosed, for example, in my prior Patent No. 2,082,759, issued June 1, 1937. Other aeration means, such as trickling filters, Nidus racks or Imhoff contact aerators, may be used although the results may be inferior. The aeration tank 21 may be of such size that it will have whatever period of detention is necessary to accomplish the desired degree of treatment. The size will of course depend upon the rate of flow of water into and out of the tank and also upon the amount and nature of the impurities, the degree to which it is desired to remove them, and the efficiency of the particular tank and the treating agencies therein.

As in the case of activated sludge treatment of sewage, the treating agencies will be biological in nature. These biological treating agents could be called "activated flocs" to distinguish them from the somewhat different activated sludge known in sewage. The biological agents are obtained by flowing the water from the tank 21 to a settling tank 23. This settling tank will resemble the settling tank 14 in that the water will flow through it in a quiescent state so that the solids may settle out. The clear water will flow off to mixing tank 12 while the solids or flocs which settle to the bottom of the tank will be pumped out through pipe 24, any suitable floc collecting mechanism being provided if desired. From the pipe 24 the flocs or solids may flow either through the pipe 26 back to the tank 21 or through the waste pipe 27 to be disposed of in any way. The part which returns to the aeration tank 21 may be called the return activated flocs, and it preferably enters the tank 21 near the water inlet or in such a way that it is promptly mixed with the water.

In sewage the activated sludge is easily formed from the fresh sewage by prolonged aeration thereof. In the case of water supplies, however, the impurities are in such small proportions that it may be difficult to get an adequate initial supply of the activated flocs or biological agents. Accordingly, in starting up a plant constructed in accordance with this invention it will be desirable to initially add to the aeration tank 21 an adequate supply of bacterial agents. This may be in the form of activated flocs taken from another water treating plant embodying this invention or similar treatment plants if available. If necessary, the flocs may be formed merely by running surface water through the plant, the water supply itself being sufficient if it is surface water. In this case it may be several weeks or even months before the flocs are fully developed. Even if flocs from another plant are added, some time may elapse before they become fully effective for the particular supply being treated. Apparently either a different strain of aerobic bacteria develops or the enzymes carried by the bacteria change. In any event, the flocs adapt themselves to their new task and become very efficient in treating the very small proportions of impurities found in the water supply. These impurities may be chemical wastes, such as phenols or dyes, or they may be microscopic growths, such as algae and planktons. The impurities which are of a character not to be removed by the coagulant chemicals and the sand filter are effectively reduced by the aeration treatment in the presence of an adequate supply of biological agents.

The biological agents operate by coming into contact with substantially all parts of the water, probably coming in contact with a very high percentage of the individual molecules. To accomplish this the biological agents should comprise a substantial proportion of the contents of the aeration tank and of course there should be thorough and continuous mixing. A considerable supply of dissolved oxygen is necessary to enable the biological agents to perform their function, and it is for this reason that an aeration tank is used. The best proportion of biological agents can be determined by experiment, but mixtures containing anywhere from 1000 to 3000 parts per million by weight of total suspended solids will perform the function satisfactorily, since the amount of solids in the untreated water is usually negligible. Enough flocs should be mixed with the fresh water coming in so that the solids or flocs amount to 1000 to 3000 parts per million parts of the combined flocs and water. The water with the flocs, which is present in varying proportions, of course does not count toward the weight of solids.

With some water supplies the biological aeration performed in tank 21 will be so effective that the tanks 12 and 14 may be omitted, and the effluent from settling tank 23 may be flowed directly to the sand filter 16.

It is not necessary that the biological aeration treatment be carried to such an extent that the activated carbon treatment may be omitted entirely. Very faint traces of complexes causing taste, color or odor may be removed more economically by very small amounts of activated carbon than by prolonged aeration, and in fact it is contemplated that the addition of small amounts of activated carbon will be common. It should also be understood that the water may undergo any other desired treatments, as, for example, chlorination.

Although the biological aeration treatment may be performed between any other stages of the treatment of the water, it is preferred that it be performed initially since the biological agents are most effective when unhampered by the presence of the chemicals used in subsequent treatment. As a matter of fact, if the biological aeration treatment were used in subsequent parts of the system it might be necessary to continually add fresh flocs from external sources.

*Summary of process*

The water from the pond, stream, or other source of supply 11 flows into the aeration tank 21 where it is continuously mixed with activated flocs or biological agents and oxygen and from which it flows into the settling tank 23. The sediment in the settling tank is used in the aeration tank, and the excess is disposed of. The clear water from settling tank 23 flows into mixing tank 12 in which it is mixed with coagulant chemicals from the supply 13. From the mixing tank 12 the water flows into settling tank 14. The sediment in this tank may be removed periodically in any desired manner, and the clear water flowing therefrom passes through a rapid sand filter 16 which further clarifies the water. The foregoing treatment removes some foreign matter causing taste, color or odor which have not heretofore been removed even by activated carbon. If any traces are left, they may be rendered ineffective by very small and inexpensive amounts of activated carbon supplied from a source of supply 17. The water may also be subjected to any other desired treatments. The clear, colorless, odorless and safe water now flows into reservoir 18 from which, as consumption requires, it passes into the distribution system 19.

I claim:

1. The method of treating a water supply containing small amounts of foreign matter causing odor or taste, to make it satisfactory for human consumption and like purposes, which includes the step of reducing to a mere trace said foreign matter therein by flowing the water into an aeration tank, mixing it with activated flocs including aerobic bacteria obtained by aerating and agitating previous quantities of water while free of added precipitate-forming chemicals, withdrawing the water from the zone of agitation, settling said flocs from the water and returning them to fresh quantities of water, agitating and aerating the mixture while free of added precipitate-forming chemicals until the proportion of said foreign matter unsettleable in the water has been reduced to approximately one one-hundredth part in a million, separating from the water the flocs resulting from this treatment and withdrawing clear water.

2. The method of treating a water supply containing small amounts of foreign matter causing odor or taste, to make it satisfactory for human consumption and like purposes, which includes the step of reducing to a mere trace said foreign matter therein by flowing the water into an aeration tank, mixing it with activated flocs including aerobic bacteria obtained by aerating and agitating previous quantities of water while free of added precipitate-forming chemicals, withdrawing the water from the zone of agitation, settling said flocs from the water and returning them to fresh quantities of water, agitating and aerating the mixture while free of added precipitate-forming chemicals until the proportion of said foreign matter unsettleable in the water has been reduced to approximately one one-hundredth part in a million, separating from the water the flocs resulting from this treatment, withdrawing clear water and adding activated carbon to the clear water in quantities substantially less than would have been required for the same final result by the raw water.

JAMES D. WALKER.